UNITED STATES PATENT OFFICE.

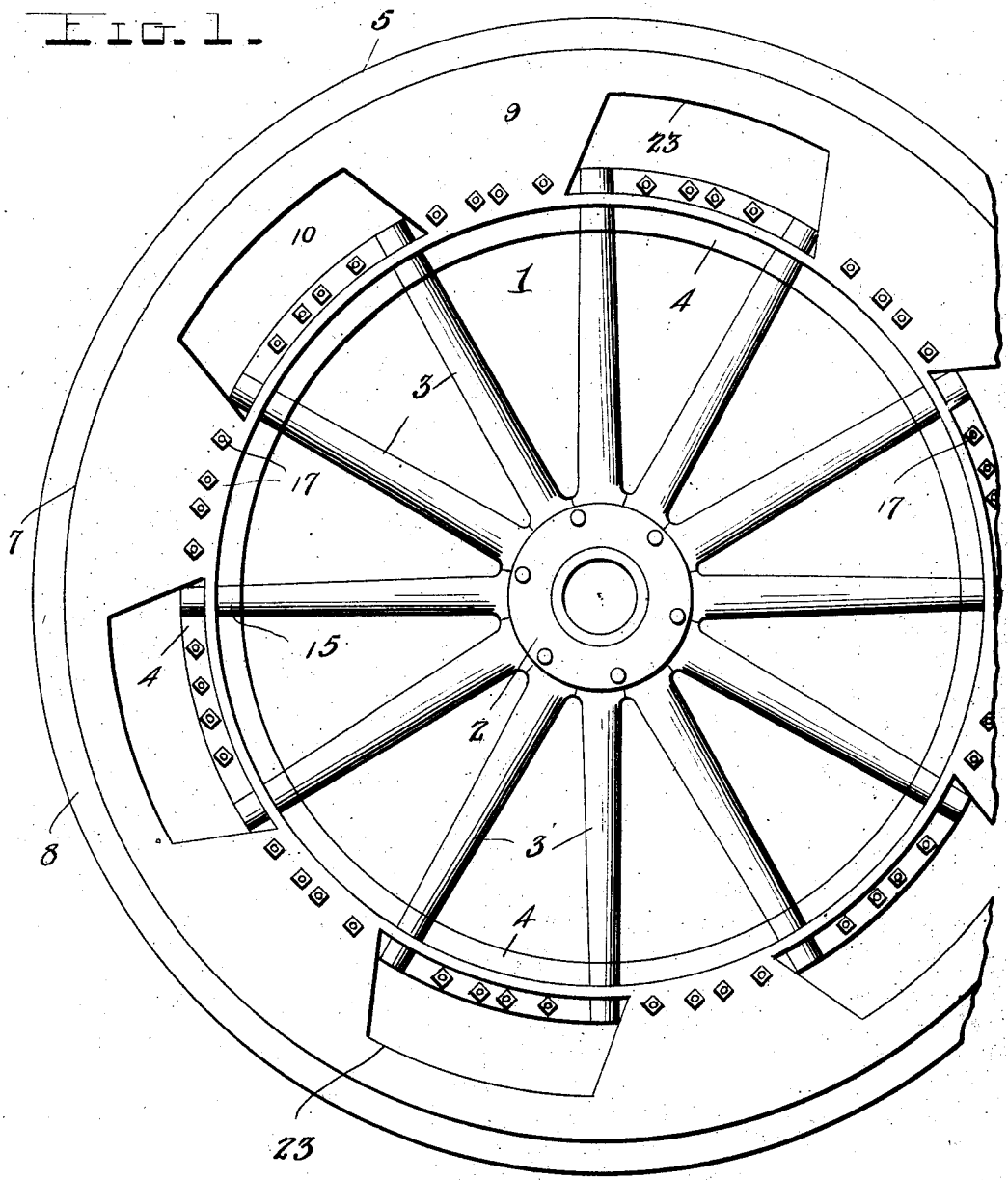

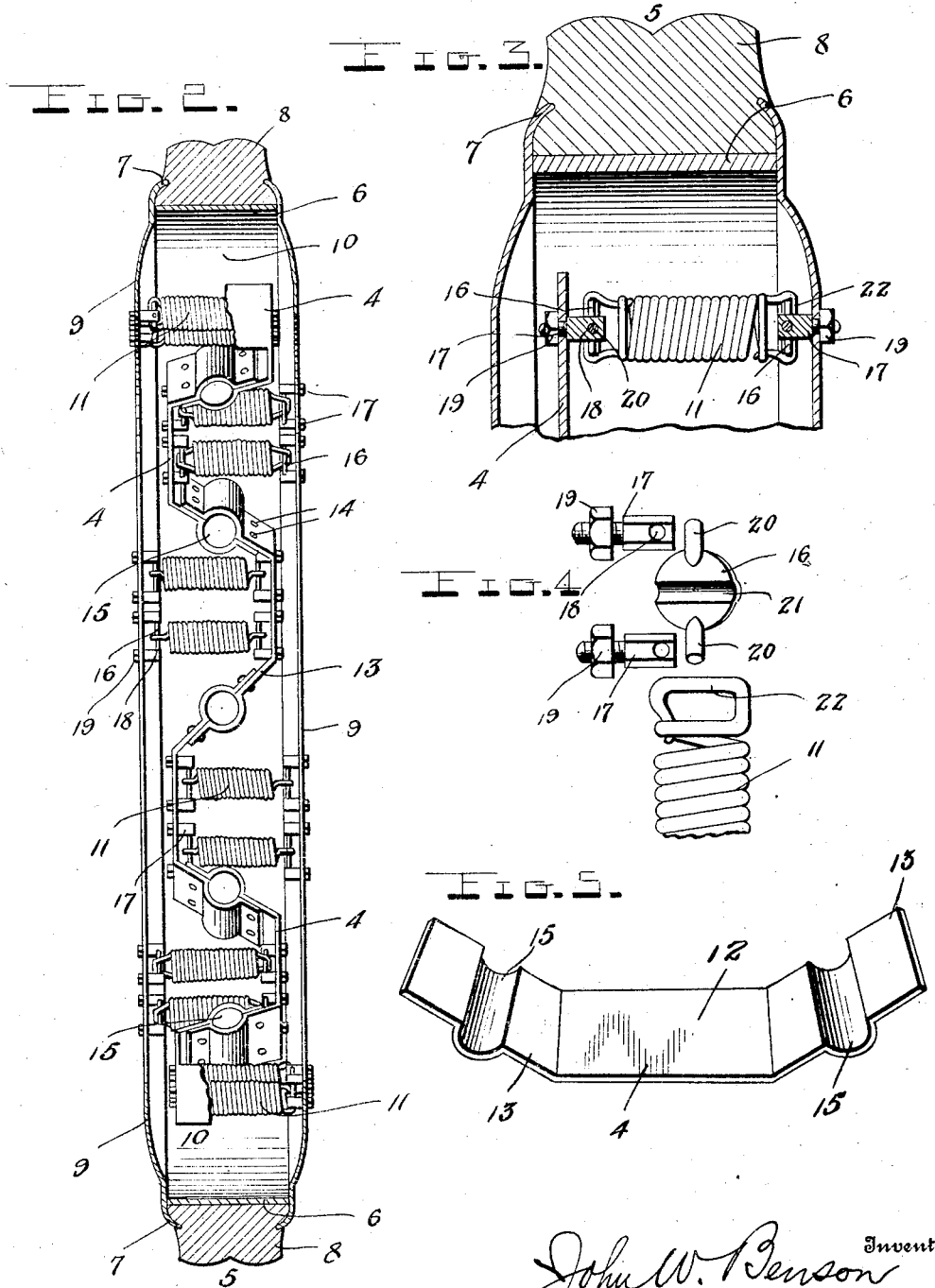

JOHN W. BENSON, OF NORTH WAYNE, MAINE.

SPRING-WHEEL.

No. 924,724.  Specification of Letters Patent.  Patented June 15, 1909.

Application filed July 7, 1908. Serial No. 442,366.

*To all whom it may concern:*

Be it known that I, JOHN W. BENSON, a citizen of the United States, residing at North Wayne, in the county of Kennebec and State of Maine, have invented certain new and useful Improvements in Spring-Wheels, of which the following is a specification, reference being had to the accompanying drawings.

My invention relates to improvements in spring wheels of that class having a hub portion elastically supported within a rim or tread portion.

The object of the invention is to provide a simple and practical wheel of this character which will be strong and durable and in which the load will be evenly distributed upon all the springs.

With the above and other objects in view, the invention consists of the novel features of construction and the combination and arrangement of parts hereinafter fully described and claimed, and illustrated in the accompanying drawings, in which—

Figure 1 is a side elevation, with parts broken away and in section, of my improved spring wheel; Fig. 2 is a vertical transverse section through the outer and inner rim portions of the wheel, the hub and the spokes being removed; Fig. 3 is a detail section through a portion of the rim showing the manner in which the springs are mounted; Fig. 4 is a detail view showing the parts of one of the spring connections separated; and Fig. 5 is a detail view of one of plates or sections of the rim of the hub portion of the wheel.

My improved spring wheel comprises a central or hub portion 1 consisting of a hub 2, spokes 3 radiating from the latter and a rigid or stationary rim 4 uniting the outer ends of the spokes. The wheel has a rim or tread portion 5 within which the hub portion 1 is elastically supported and which comprises an annular band or rim 6, a tread 8 of rubber or the like arranged upon the band 6 and retained thereon by the outwardly projecting edges 7 of two side plates 9 arranged upon and secured to the edges of the band 6, said outer edges 7 forming annular flanges which are inwardly turned to clench the tread 8 upon the band or rim 6. The inner edges of the side plates 9 are adapted to slidably receive the rim section 4 of the hub portion 1 between them, as shown more clearly in Fig. 3 of the drawings.

The rim section 4 of the hub portion is of less diameter than the rim section 6 of the rim or tread portion 5 so as to provide a space 10 within the latter for the movement of the hub portion. Said hub portion is elastically supported within the tread portion by springs 11 disposed transversely, and preferably in pairs, between the side plates 9 and the rim section 4. The springs 11 are preferably stiff coil springs and in order to permit of the use of comparatively long ones without unduly increasing the width or thickness of the wheel I make the rim section 4 of zig zag shape so as to provide offset portions within each of which is disposed one pair of the springs. Said rim section 4 is also preferably made of a plurality of metal plates or sections each of which has a central portion 12 with angular portions 13 at its ends. Said angular end portions 13 of the adjacent sections are adapted to engage each other and to be secured by rivets or the like 14 and in their opposing faces are formed co-acting recesses or seats 15 which form sockets for the reception of the reduced ends of the spokes 3.

The springs 11 are preferably attached to the plates 9 and the plates 12 by swiveled connections which consist of grooved attaching plates 16 with which the ends of the springs are pivotally engaged and which are in turn pivotally mounted in bearings 17. The latter are in the form of eye bolts having enlarged inner ends or heads formed with bearing apertures 18 and reduced threaded outer ends passed through openings in the plates 9, 12 and engaged by clamping nuts 19. The bearing openings 18 in these eye bolts receive pivot studs 20 formed at diametrically opposite points on the attaching members or plates 16. The latter are preferably circular in shape and are formed with bearing grooves 21 which are disposed transversely or in a plane at right angles to the axis of the pivots 20 and which receive square loops 22 formed upon the ends of the springs. These loops 22 are preferably constructed as shown more clearly in Fig. 4 and they are adapted to turn or rotate in the bearing grooves 5 so that universal joints or connections may be provided for the ends of the springs.

It will be seen that owing to the transverse disposition of the springs in an annular row around the entire wheel and to their universal or swiveled connections, the hub portion of the wheel will be elastically supported within the rim portion and that the load upon the hub portion will be evenly distributed upon each of the springs at all points around the wheel and not upon merely the springs at the top and bottom of the wheel, as is the case in spring wheels heretofore designed. The transverse disposition of the springs causes all of the latter to assist in supporting the load and their universal connections relieve them of undue strain and permit of the more equal disposition of the load. In order to permit any dirt that may enter the space 10 to drop out of the same I may form at intervals around the side plates 0 openings 23 of suitable size and shape. Said openings 23 also reduce the weight of the wheel.

From the foregoing it will be seen that my improved wheel is exceedingly simple, strong, durable and inexpensive in construction and that the load upon it will be as elastically supported as it would be if the wheel was equipped with a pneumatic tire. Owing to the peculiar disposition of the springs the inner or hub portion of the wheel will be suspended within the outer or rim portion so that it can spring upwardly, downwardly, forwardly or rearwardly to prevent any shock or jar, incident to the travel of the outer rim or tread portion over rough roads, from being imparted to the load.

Having thus described my invention what I claim is:

1. A wheel of the character described comprising a channeled rim or tread member, a hub member having a continuous annular rim section arranged within the rim or tread member and having laterally offset portions, said rim section consisting of a plurality of plates having angular extensions overlapped and united, whereby the laterally offset portions are formed, and transversely disposed springs arranged in and secured to said offset portions of the rim section and to the opposite sides of the rim or tread member, substantially as and for the purpose set forth.

2. A wheel of the character described comprising a hub, spokes radiating therefrom, a rim section carried by said spokes and consisting of plates with angular extensions having united overlapping ends formed with sockets to receive the spokes, said plates forming oppositely disposed offset portions in the rim section, a channeled tread portion to receive said rim section and transversely disposed coil springs arranged in the offset portions of said rim sections for elastically supporting the hub portion within the tread portion.

3. A wheel of the character described comprising a hub, spokes radiating therefrom, a rim section carried by said spokes and consisting of plates having united overlapping angular ends formed with sockets to receive the spokes, said angular plates forming oppositely disposed offset portions in the rim section, a channeled tread portion having side plates to receive the rim section between them, transversely disposed coil springs arranged in the offset portions of said rim section, and universal connections between the ends of said coil springs and said side plates of the tread portion and said rim section.

4. A wheel of the character described comprising a hub portion having a rim section provided with oppositely disposed offset portions, a channeled tread portion consisting of an annular band, inwardly projecting side plates to receive said rim section between them, outwardly projecting flanges and a tread proper retained upon said band by said flanges, and transversely disposed coil springs arranged in the offset portions of the rim section for elastically supporting the hub portion within the tread portion.

In testimony whereof I hereunto affix my signature in the presence of two witnesses.

JOHN W. BENSON.

Witnesses:
B. E. BELCHER,
E. L. STEVENS.